April 25, 1950 — L. CHASE — 2,505,637
CLOSURE FOR FUEL TANKS
Filed Nov. 15, 1947 — 3 Sheets-Sheet 1

INVENTOR.
LIONEL CHASE
BY William Isler
ATTORNEY.

April 25, 1950     L. CHASE     2,505,637
CLOSURE FOR FUEL TANKS
Filed Nov. 15, 1947     3 Sheets-Sheet 2
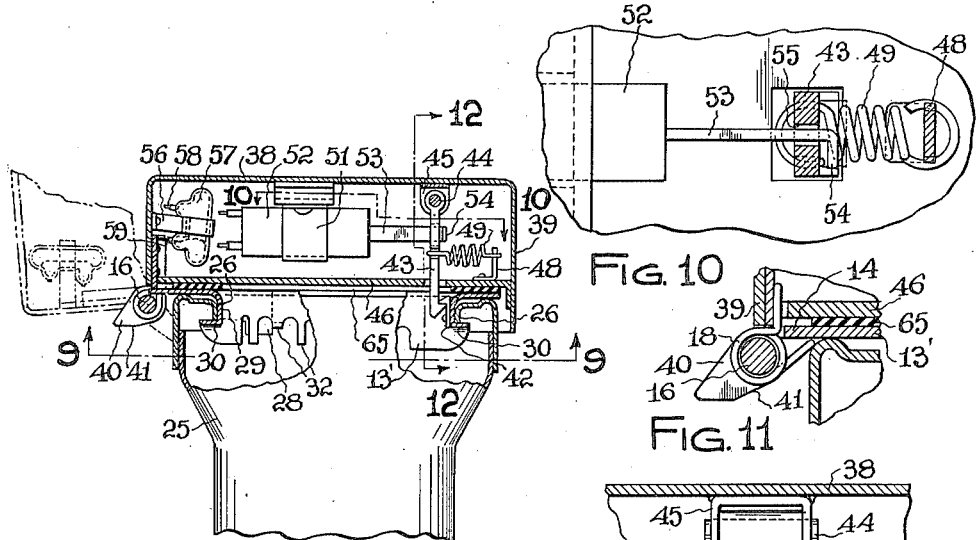
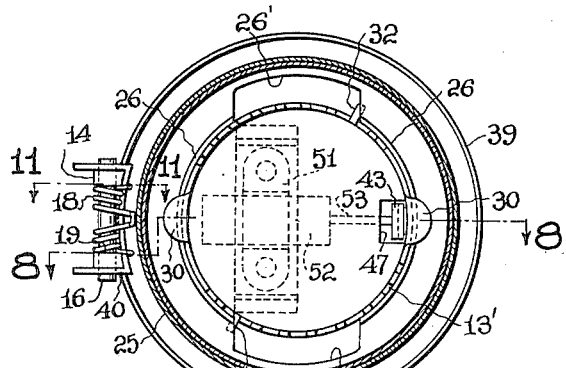
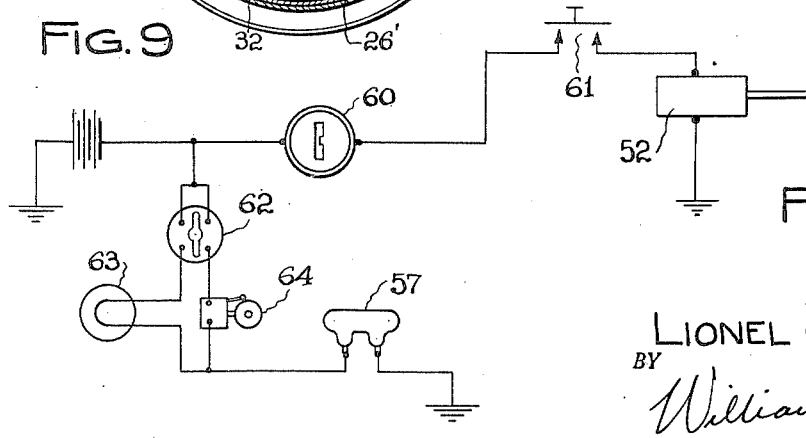
INVENTOR.
LIONEL CHASE
BY William Isler
ATTORNEY.

April 25, 1950     L. CHASE     2,505,637
CLOSURE FOR FUEL TANKS

Filed Nov. 15, 1947     3 Sheets-Sheet 3

*INVENTOR.*
LIONEL CHASE
BY William Isler
ATTORNEY.

Patented Apr. 25, 1950

2,505,637

UNITED STATES PATENT OFFICE 2,505,637

CLOSURE FOR FUEL TANKS

Lionel Chase, North Olmstead, Ohio, assignor to Marchmont Products, Inc., Cleveland, Ohio, a corporation of Ohio Application November 15, 1947, Serial No. 786,212

3 Claims. (Cl. 220—30.6)

This invention relates generally to closures for tanks, but more specifically to hinged closures which are adapted to be mounted on the filler tubes of tanks such as automobile gasoline tanks and the like.

It is the primary object of the present invention to provide a closure which is hingedly mounted on the filler tube of the tank, thereby being irremovable and not subject to being lost or misplaced.

Another object of my invention is to provide a closure of the type described which can be mounted on the filler tubes of tanks which are presently not equipped with hinged closures.

Still another object of my invention is to provide improved means for mounting the hinged closure on existent types of filler tubes.

A further object of my invention is to provide a hinged closure having improved sealing means to prevent the escape of fumes or liquid from the tank.

Another object of my invention is to provide a hinged closure of the type described which may be unlocked by actuating means located at a point remote from the closure itself, such as, for example, by control means located on the dashboard of an automobile.

An additional object of my invention is to provide a hinged closure of the type described, which is adapted to sound an alarm or give other appropriate signals when it is accidentally left open or when it is opened by an unauthorized person.

Other objects and advantages of my invention will become apparent during the course of the following description.

In the accompanying drawings, forming a part of this specification, and in which like numerals are employed to designate like parts throughout the same:

Fig. 8 is a longitudinal cross-sectional view of a modified form of my invention, taken on line 8—8 of Fig. 9.

Fig. 9 is a cross-sectional view taken on line 9—9 of Fig. 8.

Fig. 10 is an enlarged fragmentary cross-sectional view taken on line 10—10 of Fig. 8, showing details of the plunger and latch mechanism.

Fig. 11 is an enlarged fragmentary cross-sectional view taken on line 11—11 of Fig. 9, showing details of the hinge structure.

Fig. 12 is an enlarged fragmentary cross-sectional view taken on line 12—12 of Fig. 8 showing additional details of the latch structure.

Fig. 13 is a diagrammatic view of the electrical wiring circuit employed in connecton with the form of invention shown in Figs. 8 to 12 inclusive.

Figure 1:
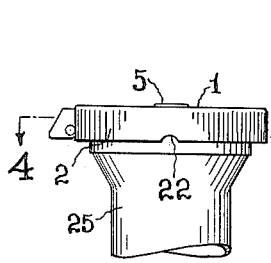
Fig. 1 is a side elevational view of the closure, showing the cover in the closed position.

Referring now to Figs. 1 to 7 of the drawings, the closure is seen to comprise a circular cover 1 provided with a circumferentially depending flange or skirt 2 which is recessed as at 3, to permit the free passage of a hinge member 4; the recess 3 also serving a purpose to be hereinafter described.

A stud 5 is rigidly secured to the cover 1, centrally thereof, and serves as a pivotal mounting for the hinge member 4.

A sealing disc 6 provided with a radially extending offset flange portion 7 is also carried by the stud 5 and is resiliently held, against a washer 8 and securing nut 9, by the fingers 11 of a flat spring 10 which is also mounted on the stud 5.

A friction reducing washer 12 is interposed between the spring 10 and the hinge member 4.

The cover 1 is hingedly secured to an adapter element 13 which is provided with a hinge extension 14 which is retained between opposing ears 15 of the hinge member 4 by a hinge pin 16 which extends through openings 17 provided therefor in the ears 15.

A coil spring 18 is also mounted on the hinge pin 16, a recess 19 being provided therefor in the hinge 14. One end of the spring 18 rests against the surface of the filler tube and the other end of the spring 18 resiliently presses against the hinge member 4, thereby urging the cover 1 into the open position shown in Fig. 2.

The circumference of the adapter 13 is intercepted by a pair of diametrically opposed cams 20 which depend from the edge 21 of the adapter and are formed integrally therewith.

The cams 20 cooperate with a pair of lugs 22 formed by indenting the skirt 2 of the cover 1 at diametrically opposed points.

The adapter 13 is provided with an opening 23 which is concentric with the sealing disc 6, and which is also concentric with an opening 24 in a conventional filler tube 25, such as is used on automobile fuel tanks.

As is customary in such filler tubes, the filler tube 25 is provided, internally thereof, with a pair of depending flanges 26 extending axially thereof and separated each from the other by opposed recesses 26', each of the flanges 26 having a camming edge 27 and an extended portion which acts as a stop 28, the similar portions of each flange being diametrically opposite each other.

Figure 4:
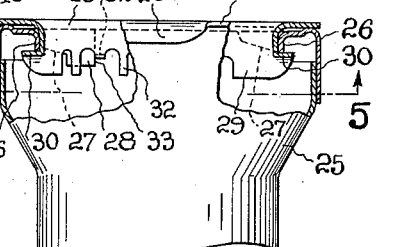
Fig. 4 is an enlarged cross-sectional view taken on line 4—4 of Fig. 1.

The adapted 13 is provided with an integrally formed depending flange 29 on which is formed a pair of outwardly extending lugs 30. The diameter defined by the lugs 30 is greater than the diameter defined by the flanges 26 but is less than the diameter defined by the recesses 26', thereby permitting the flange 29 of the adapter 13 to be inserted in the opening 24 of the filler tube 25, the recesses 26' providing the necessary clearance for the lugs 30. Upon rotation of the adapter 13 in a clockwise direction (as seen in Fig. 4), the lugs 30 are adapted to cooperate with the flanges 26 and seat the adapter securely on the filler tube 25.

Figure 5:
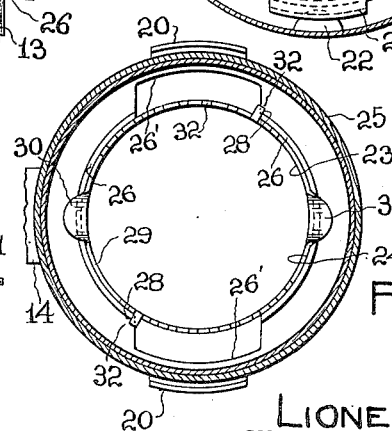
Fig. 5 is a cross-sectional view taken on line 5—5 of Fig. 2.
Figure 7:
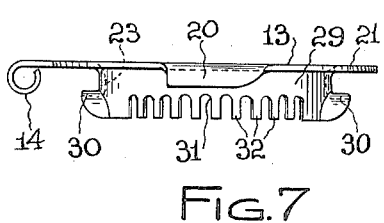
Fig. 7 is a detail view in elevation of the adapter.

The flange 29 is also provided with two groups of circumferentially spaced notches 31 which outline a series of finger 32. Each group of fingers 32 precedes its complementary lug 30 in a clockwise direction, so that, once the adapter is secured to the filler tube, it may be made irremovable by bending one of the fingers 32 of each group of fingers in a radial direction (as best seen in Fig. 5), so as to abut an edge 33 of each of the stops 38, thereby preventing counter-rotation of the adapter 13.

The operation of the closure will now be briefly described.

Figure 6:
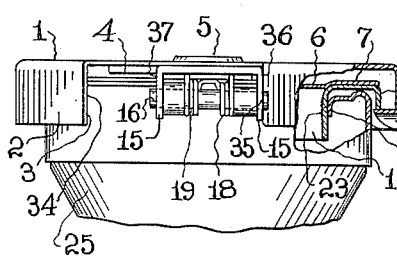
Fig. 6 is an enlarged end view in elevation of the closure, as seen from the left of Fig. 1, portions thereof being removed to show the relation of the parts in sealing engagement.

As best seen in Fig. 6, the recess 3 in the cover 1 is defined by edges 34 and 35 on the skirt 2 and the recess is of such dimension as to permit a limited amount of rotation of the cover 1 relatively to the hinge member 4.

When the cover 1 is in the locked position, as seen in Fig. 6, the lugs 22 cooperatively engage the cams 20 and the edge 35 of the recess 3 abuts an edge 36 of the hinge member 4. In the locked position, the sealing disc 6 is seated in the adapter opening 23, being urged into tight engagement therewith by the action of the spring fingers 11.

When it is desired to unlock the closure, the cover 1 is rotated in a counter-clockwise direction, as seen in Fig. 4, thereby disengaging the lugs 22 and the cams 20, the rotation being limited by the abutment of the edge 34 with an edge 37 of the hinge member 4.

Figure 2:
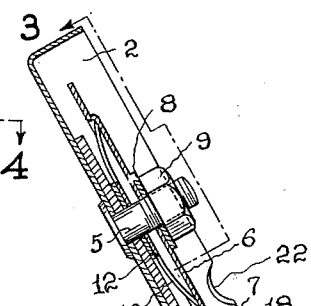
Fig. 2 is an enlarged view, partly in section and partly in elevation, showing the closure with the cover in its open position; portions being broken away to show details of the assembly.
Figure 3:
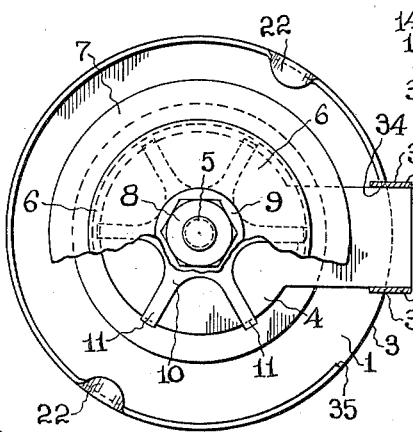
Fig. 3 is a view taken on line 3—3 of Fig. 2, showing details of the cover assembly.

Upon disengagement of the cover 1 from the cams 20, the coil spring 18 rotates the cover 1 about the hinge pin 16 to the open position shown in Fig. 2, this movement of the cover being limited by the abutment of an edge 38 of the ears 15 with the body of the filler tube 25.

To again lock the closure, the cover 1 is forced downwardly against the action of the coil spring 18 until the sealing disc 6 is again seated in the adapter 13, and the cover is then rotated in a clockwise direction thereby again engaging the cams 20 and lugs 22.

In Figs. 8 to 12, inclusive, is shown a form of closure which is constructed in such a manner as to be operable from a point remote from the closure itself, for example, from the dashboard of an automobile. An adapter 13' is employed in combination with the closure so that the closure is adapted to replace the separable, manually-operated cap or cover commonly used for automobile fuel tanks.

As best seen in Figs. 8 and 9, the closure consists of a circular cover 38 provided with an annular depending skirt 39 to which is secured a hinge member 40, one portion of which also acts as a stop 41. The cover 38 is hingedly connected to the adapter 13' by means of the hinge pin 16 which interconnects the hinge portion 40 with the hinge extension 14 on the adapter 13'. The hinge extension 14 is recessed as at 19 so as to permit the coil spring 18 to be carried by the pin 16, the free ends of the spring being compressed between the surface of the filler tube 25 and the surface of the skirt 39. (See Fig. 11.)

The adapter 13' is irremovably secured to the filler tube 25 in the manner previously described in the discussion pertaining to Figs. 1 to 7 of the drawings. That is, the adapter is provided with lugs 30 formed on the flange 29, which lugs are adapted to cooperate with the flanges 26 on the filler tube when the adapter is rotated. One finger of each of the two groups of fingers 32 is then bent adjacent the stop 28 to prevent counter-rotation of the adapter. The adapter 13' is thus securely seated on the filler tube 25.

The closure locking mechanism comprises a keeper element 42, which is secured to the inner surface of the flange 29 of the adapter 13' at a point diametrically opposite the hinge 14, and a latch member 43 which is pivotally suspended from the cover 38 by means of a pin 44 and a bracket 45 which is secured to the cover.

A sealing disc 46 is secured to the cover 38, the disc 46 being provided with an opening 47 to permit the passage of the latch member 43 therethrough. A lug 48 is mounted on the disc 46 and serves to retain one end of a coil spring 49, the other end of which is secured to a constricted portion 50 on the latch member 43, so as to resiliently maintain the latch member in abutment with one edge of the opening 47 when the cover 38 is open and similarly to urge the latch member into locking engagement with the keeper 42 when the cover is closed.

Within the cover 38 there is mounted, as by a bracket 51, a solenoid 52 which is provided with a movable core or plunger 53 terminating in a bent portion 54. The plunger 53 passes through an opening 55 provided therefor in the latch 43 and is adapted to operatively engage the latch 43 when the solenoid is energized, thereby withdrawing the latch member 43 from its engagement with the keeper 42, against the action of the spring 49, and permitting the cover 38 to swing open by the action of the spring 18.

Also mounted within the cover 38, as by a bracket 56, is a sealed mercury switch 57 provided with electrical leads 58 and 59. When the cover 38 is unlatched and swings open, it assumes the position shown in dotted outline in Fig. 8, being arrested against further rotation by the abutment of the stop 41 against the filler tube 25. In this open position, the mercury conductor within the switch 57 bridges the leads 58 and 59 and thereby closes a signal circuit as shown in Fig. 13.

Referring now to Fig. 13, the numeral 60 designates the ignition switch of an automobile or the like, which is connected on one terminal to an electrical storage battery and to the other terminal of which is connected, through a push button switch 61, one lead of the solenoid 52, the other lead of the solenoid being grounded to complete the circuit.

The signal circuit comprises a double pole snap switch 62 which is connected to the battery, a visible signal such as a lamp 63, an audible alarm such as the automobile horn or a bell 64, and the mercury switch 57, one lead of which is grounded to complete the circuit.

Thus it will be apparent that when the operator of an automobile drives into a service station to refuel, he has merely to push the switch 61 momentarily, while the ignition switch 60 is in the on position, whereby the circuit to the solenoid will be closed and the cover 38 will become unlatched.

When the cover swings open the mercury switch 57 will close the signal circuit thereby actuating either the lamp 63 or the bell 64 depending upon the selected position of the switch 62. It is assumed that the switch 62 will normally be in position to close the bell circuit, its position being changed to the lamp circuit only when the automobile is being refueled.

The closure and the electrical circuit are thus constructed and arranged so that any unauthorized opening of the cover 38 will actuate an alarm signal audible to by-standers. On the other hand, the operator may unlock the closure without leaving the automobile and the visible signal will indicate to him when the cover has sprung open and also when it has again been closed and locked.

A gasket 65 may be employed between the surfaces of the adapter 13' and the cover disc 46 so as to more effectively seal the filler tube opening against the entrance of moisture or foreign matter.

Figure 14:
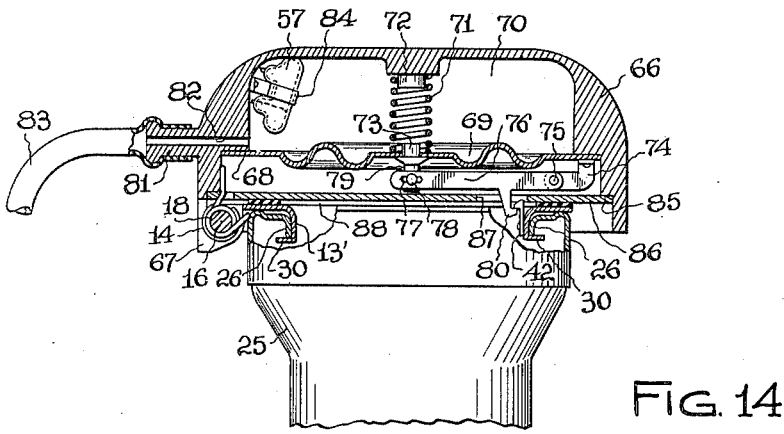
Fig. 14 is a longitudinal cross-sectional view of another modified form of my invention, with parts thereof broken away to more clearly show certain details.

Referring now to Fig. 14, I have shown a modified form of closure in which the unlocking mechanism is actuated by air pressure. In this modification, the adapter 13' is again used to permit the closure to be installed as a replacement for the existent type of manual filler tube caps. A cover 66 is provided with a hinge portion 67 and is pivotally connected to the adapter 13' by means of the hinge pin 16 and the hinge 14 on the adapter. The coil spring 18 is carried by the pin 16 so as to urge the cover 66 to rotate to the open position (counter-clockwise as seen in Fig. 14).

The cover 66 is formed interiorly thereof to provide an annular shoulder 68 to which is secured a circular flexible diaphragm 69, thereby forming a substantially air-tight chamber 70 in the upper portion of the cover. The diaphragm is normally urged downwardly by a compression coil spring 71 which is retained between a boss 72 on the cover 66 and a boss 73 on the diaphragm.

Diametrically opposite the hinge portion 67 of the cover 66, there is secured to the shoulder 68 a support bar 74 provided with a pivot pin 75 which pin acts as a fulcrum for a latch lever 76, one end of which is pivotally mounted on the pin 75. The other end of the latch lever 76 is slotted, as at 77, so as to permit the passing therethrough of a screw 78 which is threaded into a link member 79, the line 79 being an extension of the boss 73 and projecting from the diaphragm 69 centrally thereof.

The latch lever 76 is provided with a downwardly projecting catch 80 which is adapted to cooperate with the keeper 42 which is mounted interiorly of the adapter 13'.

The cover 66 is formed exteriorly thereof to provide a nipple 81 having a channel 82 leading into the chamber 70. The nipple is adapted to receive one end of a conduit or hose 82, the other end of which is connected through a valve to a suction device such as the air intake manifold of an automobile engine.

Thus, when the air pressure is reduced in the chamber 70, the diaphragm 69 is forced upwardly against the action of the coil spring 71. This movement of the diaphragm causes the link member 79 to move vertically upwardly, thereby causing the latch lever 76 and its unitary catch 80 to pivot about the pin 75 in a clockwise direction, the slot 77 in the latch lever permitting free lateral movement of the lever relative to the screw 78.

The catch 80 is thereby withdrawn from its locking position relatively to the keeper 42, and the cover 66 swings open under the actuation of the spring 18, the cover being limited in its rotation by abutment of the hinge portion 67 against the filler tube 25.

Figure 16:
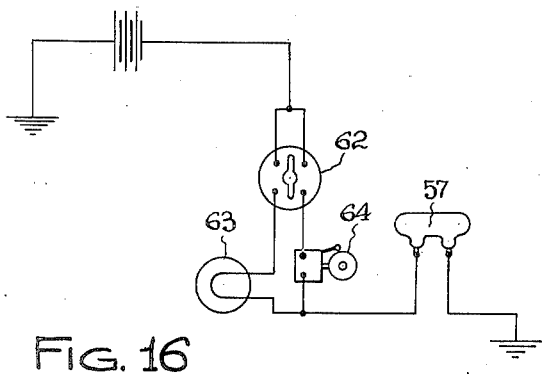
Fig. 16 is a diagrammatic view of the electrical wiring circuit employed in connection with the forms of my invention shown in Figs. 14 and 15.

A sealed mercury switch 57 is mounted within the cover 66, as by means of a bracket 84, and is disposed at such an angle that the opening of the cover causes the mercury to bridge the leads thereof and complete the signal circuit shown in Fig. 16.

The cover has also formed therein a second annular shoulder 85 which serves as a seat for a circular sealing disc 86, secured thereto. The disc is provided with an opening 87 which permits the projection therethrough of the catch 80. A gasket 88 completes the assembly.

As soon as the cover 66 has been unlatched, the air pressure on the diaphragm 69 may be equalized by operation of the aforementioned valve and the coil spring 71 returns the diaphragm to its initial position.

When the cover 66 is manually closed, the catch 80 is forced past the keeper 42 and the closure is locked. This position of the cover causes the mercury switch 57 to break the signal circuit thereby indicating to the operator that the cover has been closed.

As seen in Fig. 16, by means of the snap switch 62, the operator may select either the lamp circuit or the audible signal circuit, the audible signal circuit being normally employed so as to indicate to bystanders an unauthorized attempt to force open the closure.

Figure 15:
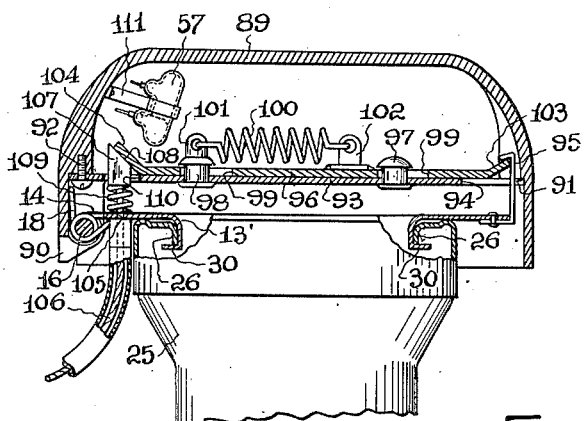
Fig. 15 is a longitudinal cross-sectional view of still another modified form of my invention, with portions thereof broken away to show certain details more clearly.

In Fig. 15, I have shown an additional modification of my invention in which the filler tube closure is adapted to be unlocked by mechanical means which are actuated from a remote point, such as the interior of an automobile.

In this form of closure, as in the others previously described, a cover 89, having a hinge portion 90, is hingedly connected to the hinge 14 of the adapter 13' by means of the hinge pin 16.

The spring 18 is carried by the pin 16 in such a manner as to urge the cover to rotate in a counter-clockwise direction, that is, to the open position. The adapter 13', in turn, is irremovably secured to the filler tube 25 by means of the lugs 30 and the fingers 32, as previously described.

The cover 89 has an annular shoulder 91 formed interiorly thereof, to which is secured as by screws 92, a circular plate 93 having an opening 94 therein. The opening 94 permits a spring metal keeper 95, which is mounted on the adapter 13', to project upwardly through the plate 93.

A latch bar 96 is slidably mounted on the plate 93, being secured thereto by fastening elements 97 and 98 which extend through elongated slots 99 provided in the latch bar 96. A coil spring 100 is suspended between an ear 101 which is secured to the fastening element 98 and an ear 102 which is welded to the latch bar 96, thereby normally urging the latch bar to the left, as seen in Fig. 15.

The ends 103 and 104 of the latch bar 96 are bent or upturned to form camming surfaces, the end 103 being adapted to interengage the keeper 95 so as to lock the cover in place.

The adapter 13' is provided with an opening 105 to permit the passage therethrough of a sheathed flexible cable 106, one end of which terminates in a control knob (not shown) in the interior of the automobile and the other end of which terminates in a button 107 having an inclined or camming surface 108. An opening 110 is provided in the plate 93 to permit the button to project therethrough. A compression coil spring 109, of greater strength than the spring 100, is mounted on the cable 106 between the button 107 and the adapter 13', thereby normally urging the button 107 into camming relationship with the end 104 of the latch bar 96.

When the cable 106 is retracted by the operator, against the action of the spring 109, the expansion coil spring 100 causes the latch bar to slidably withdraw from its engagement with the keeper 95 and thereupon the cover 89 will spring open in response to the action of the spring 18.

A mercury switch 57 is mounted within the cover 89, as by a bracket 111, and is disposed at such an angle that the mercury therein will complete the signal circuit, shown in Fig. 16, when the cover 89 is open.

As soon as the operator releases the control knob, the spring 109 will force the button 107 into camming engagement with the end 104 of the latch bar and, the spring 109 being stronger than the spring 100, the latch bar will be returned to its initial position.

Thereupon, when the cover is closed manually, the end 103 of the latch bar 96 will displace the spring metal keeper 95 and return to the locked position.

Having thus described my invention and the modifications thereof, it will be apparent that I have provided a closure for the filler tubes of tanks, particularly for the fuel tanks of automobiles, which are adaptable for installation on existent fuel tanks as a replacement for the presently used form of closure which is easily lost or misplaced.

I have also provided novel means for locking the closure in its closed position and unlocking it from a point remote from the closure itself, so that the operator of a vehicle can actuate the unlocking mechanism of the closure from the interior of the vehicle.

I have combined and coordinated this mechanism for the remote control of the closure unlocking mechanism with automatic signalling means so that if the cover be open, the operator is instantly aware thereof. The signalling means are also operative to alarm bystanders in the event an unauthorized opening of the closure is accomplished.

It is to be understood that the forms of my invention herein shown and described, are to be taken as preferred examples of the same and that various changes in the shape, size and arrangement of the parts may be resorted to, without departing from the spirit of my invention or the scope of the subjoined claims.

Having thus described my invention, I claim:

1. A closure for a filler tube having interior cam surfaces and abutments, said closure comprising a plate-like ring adapter element for securement to said tube and having an opening for registry therewith, two oppositely positioned projections depending from the inner periphery of the ring for cooperative engagement with said tube cam surfaces in the securement of the adapter element to the tube by rotation of the adapter element in one direction relative to the tube, bendable fingers also depending from said inner periphery of said adapter element and bendable into positions back of said tube abutments to prevent reverse rotation of the adapter element relative to the tube, there being such bendable fingers spaced substantially about the entire space between said projections so that two of said fingers are in positions to be bent back of the tube abutments irrespective of the relative angular relationship of the adapter element and the tube, a member hingedly connected to and normally overlying the adapter element, a cover member rotatably secured to and normally overlying said hinged member, and means on said cover member and cooperable with cam-like lugs on the outer periphery of the adapter ring for the releasable securement of the cover member to the adapter element by rotary movement of the cover member relative to the adapter element.

2. A closure, as defined in claim 1, in which said bendable fingers are substantially uniformly spaced from each other, and are all of substantially the same length and shape.

3. A closure for a filler tube having interior cam surfaces and abutments, said closure comprising a plate-like ring adapter element for securement to said tube and having an opening for registry therewith, projections on said adapter element for cooperative engagement with said tube cam surfaces in the securement of the adapter element to the tube by rotation of the adapter element in one direction relative to the tube, bendable fingers on said adapter element and bendable into positions back of said tube abutments to prevent reverse rotation of the adapter element relative to the tube, said adapter element having an outwardly projecting hinge portion, a hinge member hingedly connected to said adapter element hinge portion and normally overlying the adapter element, a cover member rotatably secured to and normally overlying said hinged member and said adapter element and having a depending peripheral skirt surrounding said adapter, spaced portions of said skirt on opposite sides of the hinge member forming radial opposed abutments which limit the relative rotation of the cover member and the hinged member, and means carried by said skirt and cooperable with said adapter element for the releasable securement of the cover member to the adapter element by rotary movement of the cover member relative to the adapter element.

LIONEL CHASE.

REFERENCES CITED

The following references are of record in the file of this patent:

UNITED STATES PATENTS

| Number | Name | Date |
|---|---|---|
| 1,809,186 | Stant | June 9, 1931 |
| 1,880,424 | Fergusson | Oct. 4, 1932 |
| 1,909,554 | Stant | May 16, 1933 |
| 1,925,079 | Allred | Sept. 5, 1933 |
| 1,989,297 | Stant | Jan. 29, 1935 |
| 2,004,872 | Johnson | June 11, 1935 |
| 2,017,837 | Anschicks | Oct. 22, 1935 |
| 2,019,393 | Carah | Oct. 29, 1935 |
| 2,057,848 | Sebek | Oct. 20, 1936 |
| 2,149,695 | Wilhelm | Mar. 7, 1939 |